United States Patent
Wang et al.

(10) Patent No.: US 12,466,937 B2
(45) Date of Patent: Nov. 11, 2025

(54) RESIN COMPOSITION AND USE THEREOF

(71) Applicant: SHENGYI TECHNOLOGY CO., LTD., Dongguan (CN)

(72) Inventors: Qing Wang, Dongguan (CN); Qianfa Liu, Dongguan (CN); Dongliang Liu, Dongguan (CN); Jinchao Dong, Dongguan (CN); Songgang Chai, Dongguan (CN); Yongjing Xu, Dongguan (CN); Yanhua Zhang, Dongguan (CN)

(73) Assignee: SHENGYI TECHNOLOGY CO., LTD., Dongguan (CN)

( * ) Notice: Subject to any disclaimer, the term of this patent is extended or adjusted under 35 U.S.C. 154(b) by 33 days.

(21) Appl. No.: 18/575,176

(22) PCT Filed: Jul. 27, 2022

(86) PCT No.: PCT/CN2022/108221
§ 371 (c)(1),
(2) Date: Dec. 28, 2023

(87) PCT Pub. No.: WO2023/020222
PCT Pub. Date: Feb. 23, 2023

(65) Prior Publication Data
US 2024/0294731 A1    Sep. 5, 2024

(30) Foreign Application Priority Data

Aug. 16, 2021 (CN) .......................... 202110935223.7

(51) Int. Cl.
| | | |
|---|---|---|
| *C08K 3/36* | (2006.01) | |
| *C08J 5/24* | (2006.01) | |
| *C08L 63/00* | (2006.01) | |
| *C09J 163/00* | (2006.01) | |

(52) U.S. Cl.
CPC .............. *C08K 3/36* (2013.01); *C08J 5/247* (2021.05); *C08L 63/00* (2013.01); *C09J 163/00* (2013.01); *C08J 2363/00* (2013.01); *C08J 2371/12* (2013.01); *C08J 2433/24* (2013.01); *C08J 2461/06* (2013.01); *C08J 2467/00* (2013.01); *C08K 2201/005* (2013.01)

(58) Field of Classification Search
CPC .......... C08L 63/00; C08L 61/06; C08L 79/04; C08L 79/085; C08K 3/36
See application file for complete search history.

(56) References Cited

U.S. PATENT DOCUMENTS

| | | | | |
|---|---|---|---|---|
| 5,674,589 A | * | 10/1997 | Bennett | B29C 55/005 |
| | | | | 524/847 |
| 2015/0022309 A1 | * | 1/2015 | Marusawa | H01F 1/01 |
| | | | | 252/62.55 |
| 2017/0087588 A1 | * | 3/2017 | Goto | B05D 3/0254 |

FOREIGN PATENT DOCUMENTS

| | | | |
|---|---|---|---|
| CN | 106315594 A | | 1/2017 |
| CN | 111303667 A | | 6/2020 |
| CN | 113015698 A | | 6/2021 |
| CN | 113621216 A | | 11/2021 |
| EP | 0257611 A2 | * | 8/1987 |
| JP | S63312319 A | | 12/1988 |
| JP | 2005023230 A | | 1/2005 |
| JP | 2011173779 A | | 9/2011 |
| JP | 2015211086 A | | 11/2015 |
| JP | 2016532759 A | | 10/2016 |
| JP | 2017088745 A | | 5/2017 |
| JP | 2019021800 A | | 2/2019 |
| JP | 2019178307 A | | 10/2019 |
| JP | 2019179222 A | | 10/2019 |
| WO | 2016116959 A1 | | 7/2016 |
| WO | 2017142094 A1 | | 8/2017 |
| WO | 2019189219 A1 | | 10/2019 |

OTHER PUBLICATIONS

Japanese Notice of Reasons for Refusal for Japanese Application No. 2024-502099, dated Jan. 30, 2025, 23 pages with English translation.
International Search Report for International Application No. PCT/CN2022/108221, mailed Oct. 20, 2022, 4 pages.
Chinese First Office Action for Chinese Application No. 202110935223.7, dated Oct. 18, 2022, 6 pages with translation.
Qiu et al., "Study on the Preparation and Particle Size Control of Silica Sphere in a Sol-Gel Process," Advanced Materials Research, vol. 787, Sep. 4, 2013, 7 pages.

* cited by examiner

*Primary Examiner* — Peter A Salamon
(74) *Attorney, Agent, or Firm* — Workman Nydegger

(57) ABSTRACT

A resin composition and the use thereof. The resin composition comprises the following components, in percentages by weight: 40-70% of a crosslinkable and curable resin and 30-60% of a filler. The filler is silicon dioxide prepared by means of an organosilicone hydrolysis method; the average particle size D50 of the silicon dioxide is 0.1-3 μm; and the particle size ratio D100:D10 of the silicon dioxide is less than or equal to 2.5. By means of the composition, a prepared adhesive film and resin-coated copper foil have a higher elongation rate, a higher peel strength, low CTE, low $D_f$, better drilling processability and higher electrical strength. A finer line processing capability can be achieved, which can be applied to a printed circuit board material of a multilayer laminate, in particular a printed circuit board material of a multilayer laminate of thin lines.

16 Claims, No Drawings

RESIN COMPOSITION AND USE THEREOF

TECHNICAL FIELD

The present application belongs to the technical field of laminates, and relates to a resin composition and an application thereof.

BACKGROUND

With the design trend of electronic products towards being light, thin, short and multi-functional in the future, the printed circuit base board, as a main support for the electronic components, has also continuously been improved at the technical level to provide high-density wiring, thin shape, fine aperture, multi-dimensional construction, etc. The substrate largely determines the performance of the printed circuit board, so it is urgent to develop a new generation of substrate.

The adhesive film and resin-coated copper foil which have no reinforcing materials can realize thinner shape, high-density wiring, fine aperture, and multi-dimensional construction and thus are developed and applied as a new generation of substrate. Due to containing no reinforcing material, the adhesive film material is generally added with an inorganic filler to improve the coefficient of thermal expansion, chemical resistance, mechanical strength and processability. The silica is an ideal inorganic filler, but due to the wide particle size distribution and high hardness, the large addition of silica will cause problems such as low elongation, poor fluidity, and processing difficulties.

CN112526823A discloses a photosensitive resin composition comprising a photosensitive resin (A), silica (B), a photopolymerization initiator (C), a reactive diluent (D) and an epoxy compound (E), wherein the silica (B) has a cumulative volume percentage of 50%, and a particle size D50 of more than or equal to 0.50 µm and less than or equal to 2.00 µm. D1.0 is more than or equal to 0.20 µm and less than or equal to 0.54 µm, and D99 is more than or equal to 5.00 µm and less than or equal to 8.40 µm. In this invention, the D99/D50 is calculated to be more than 2.5, and D100 is not limited, and the filler particles are larger.

CN103467927A discloses a thermosetting resin composition, and the composition comprises 20-70 wt % of a thermosetting resin, 1-30 wt % of a curing agent, 0-10 wt % of an accelerator and 1-50 wt % of silica micron-scale aggregates with an average particle size of 1-10 µm which are synthesized by chemical method, which can be prepared into a prepreg by impregnation or a coated product by coating.

The above prior art cannot effectively improve the elongation and peel strength of the adhesive film. Therefore, in the present application, it is expected to develop a resin composition that can make the adhesive film and resin-coated copper foil have better elongation, high peel strength, low CTE and low $D_f$.

SUMMARY

In view of the shortcomings of the prior art, an object of the present application is to provide a resin composition and an application thereof. The adhesive film and resin-coated copper foil prepared from the resin composition in the present application can have high elongation, high peel strength, low CTE, low $D_f$, good drilling processability, controllable fluidity and good adhesive-filling ability, and can be applied to printed circuit boards of multi-layer build-up boards, especially the printed circuit boards of multi-layer build-up boards with fine circuits.

To achieve this object, the present application adopts the technical solutions below.

In one aspect, the present application provides a resin composition, and the resin composition comprises the following components by weight percentage: 40-70% of a crosslinkable curing resin, and 30-60% of a filler: the filler is silica prepared by organosilicon hydrolysis, the silica has an average particle size D50 of 0.1-3 µm, and the silica has a particle size ratio D100:D10 of less than or equal to 2.5.

In the present application, by using silica obtained by organosilicon hydrolysis as the filler in the resin composition and controlling the addition amount at 30-60% (accounting for 30-60% of the whole resin composition), the average particle size D50 at 0.1-3 µm and the particle size ratio D100:D10 of the silica at less than or equal to 2.5, the composition can have better elongation, high tensile strength, high peel strength, low CTE, low $D_f$, good drilling processability and higher dielectric strength.

In the resin composition of the present application, "40-70% of the crosslinkable curing resin" means that the crosslinkable curing resin accounts for 40-70% of the whole resin composition, which can be 41%, 43%, 45%, 48%, 50%, 53%, 55%, 58%, 60%, 63%, 65%, 68% or 69%, and specific point values between the above point values are also comprised, and for reasons of space and brevity, the specific point values comprised in the range will not be listed exhaustively in the present application.

In the resin composition of the present application, a content of the silica can be 31%, 35%, 38%, 40%, 42%, 45%, 48%, 50%, 53%, 55%, 57% or 59%, and specific point values between the above point values are also comprised, and for reasons of space and brevity, the specific point values comprised in the range will not be listed exhaustively in the present application.

In the present application, if the silica content is less than 30%, the elongation of the prepared adhesive film is not significantly improved; if the silica content is more than 60%, there will be the problem of reduced peel strength.

In the present application, the silica has an average particle size D50 of 0.1-3 µm (for example, 0.3 µm, 0.5 µm, 0.8 µm, 1 µm, 1.3 µm, 1.5 µm, 1.8 µm, 2 µm, 2.3 µm, 2.5 µm, 2.8 µm or 3 µm), and a D100:D10 ratio of less than or equal to 2.5 (for example, it can be 2.4, 2.3, 2.2, 2.0, 1.8, 1.7, 1.5, 1.3, 1.0, etc.). The silica of the present application has more narrow distribution of particle size and higher purity, which can make the prepared adhesive film and resin-coated copper foil have better elongation, high peel strength, low CTE, low $D_f$, good drilling processability, higher dielectric strength and a capacity to process finer circuits.

Preferably, the silica has an average particle size D50 of 0.3-1.0 µm.

Preferably, the silica has a purity of more than 99.9% (for example, 99.91%, 99.93%, 99.95%, 99.97% or 99.99%, etc.). In the present application, the silica purity is more than 99.9%, which can make the prepared adhesive film and resin-coated copper foil have better elongation and dielectric strength.

The particle size (for example, D50, D10 or D100, etc.) involved in the present application is tested by laser diffraction method with a test instrument of Malvern laser particle size analyzer, type MS3000; the purity of the silica involved in the present application is tested by inductively coupled atomic emission spectrometer (ICP-AES).

Preferably, the silica is obtained by subjecting organosilicon to a hydrolysis reaction to obtain a preliminary product and then heating the preliminary product.

Preferably, the heating is performed at 800-1300° C., for example, 850° C., 900° C., 905° C., 910° C., 920° C., 930° C., 950° C., 980° C., 990° C., 1000° C., 1050° C., 1100° C., 1150° C., 1200° C. or 1250° C.

Preferably, the organosilicon is alkoxysilane.

Preferably, the alkoxysilane comprises tetraethoxysilane, tetramethoxysilane, tetraphenoxysilane, tetra-n-butoxysilane, tetraisobutoxysilane, or methyltriethoxysilane, dimethyldiethoxysilane, and further preferably tetraethoxysilane.

Preferably, the crosslinkable curing resin is a thermosetting curing resin, a photocurable resin or a thermosetting/photocurable dual curing resin.

Preferably, the crosslinkable curing resin comprises any one or a combination of at least two of an epoxy resin, a phenolic resin, a phenoxy resin, a cyanate resin, active ester, a polyphenylene ether resin, a maleimide resin, a hydrocarbon resin, an acrylate resin, a polyimide resin, an organosilicon resin, a polybenzoxazole resin, a polyester resin or polystyrene: preferably, the crosslinkable curing resin is a combination of an epoxy resin and a phenolic resin, and the better elongation and peel strength can be obtained.

Preferably, the epoxy resin comprises any one or a combination of at least two of a bisphenol A epoxy resin, a bisphenol F epoxy resin, a phosphorus-containing epoxy resin, an MDI-modified epoxy resin, a phenolic epoxy resin, a biphenyl epoxy resin, a dicyclopentadiene epoxy resin, a naphthalene-containing epoxy resin or an alicyclic epoxy resin.

Preferably, the phenolic resin comprises any one or a combination of at least two of a bisphenol A phenolic resin, a phenol phenolic resin, a biphenyl phenolic resin, a dicyclopentadiene phenolic resin or a naphthalene-containing phenolic resin.

In another aspect, the present application provides a resin varnish, which is obtained by dissolving or dispersing the resin composition as described above in a solvent.

The solvent in the present application is not specifically limited, as a specific example, it can be alcohols such as methanol, ethanol and butanol, ethers such as ethyl cellosolve, butyl cellosolve, ethylene glycol-methyl ether, carbitol and butyl carbitol, ketones such as acetone, butanone, methyl ethyl ketone, methyl isobutyl ketone and cyclohexanone, aromatic hydrocarbons such as toluene, xylene and 1,3,5-trimethylbenzene, esters such as ethoxyethyl acetate and ethyl acetate, or nitrogenous solvents such as N,N-dimethylformamide, N,N-dimethylacetamide and N-methyl-2-pyrrolidone. The above solvents can be used alone or in a mixture of two or more, preferably, a mixture of aromatic hydrocarbon solvents, such as toluene, xylene and 1,3,5-trimethylbenzene, and ketone solvents, such as acetone, butanone, methyl ethyl ketone, methyl isobutyl ketone and cyclohexanone, is used. Those skilled in the art can select a usage amount of the solvent according to their own experience, so that the obtained resin varnish has a suitable viscosity for use.

In another aspect, the present application provides an adhesive film, and the adhesive film is prepared by coating the resin composition according to any one of the above on a release material and then drying and/or baking the same.

Preferably, the adhesive film has a thickness of 5-300 µm, for example, 8 µm, 10 µm, 15 µm, 20 µm, 30 µm, 50 µm, 80 µm, 100 µm, 120 µm, 150 µm, 180 µm, 200 µm, 250 µm, 280 µm, 300 µm, preferably 10-200 µm, and further preferably 20-100 µm.

In another aspect, the present application provides a resin-coated copper foil, and the resin-coated copper foil comprises a copper foil and the resin composition as described above adhered to the copper foil after drying and coating.

Preferably, the resin-coated copper foil further comprises a protective film covering on the resin composition.

Preferably, a resin layer of the resin-coated copper foil (referring to a resin layer formed by the resin composition on the copper foil) has a thickness of 5-300 µm, for example, 8 µm, 10 µm, 15 µm, 20 µm, 30 µm, 50 µm, 80 µm, 100 µm, 120 µm, 150 µm, 180 µm, 200 µm, 250 µm, 280 µm or 300 µm, preferably 10-200 µm, and further preferably 20-100 µm.

Preferably, a copper foil of the resin-coated copper foil has a thickness of 1-105 µm, for example, 3 µm, 5 µm, 8 µm, 10 µm, 20 µm, 30 µm, 50 µm, 80 µm, 100 µm or 104 µm, preferably 3-35 µm, and further preferably 5-18 µm.

In another aspect, the present application provides a semi-cured prepreg, and the semi-cured prepreg is formed by impregnating fiberglass cloth with the above resin composition and drying the same.

In the present application, the fiberglass cloth can be selected from 7628, 2116, 1131, 1080, 106, 1027, 1037 and 1078 fiberglass cloths.

In another aspect, the present application provides a copper-clad laminate, and the copper-clad laminate is prepared by using one or at least two of the above adhesive film, the above resin-coated copper foil and the above semi-cured prepreg.

In another aspect, the present application provides a multilayer board, and the multilayer board is prepared by using one or at least two of the above adhesive film, the above resin-coated copper foil, the above semi-cured prepreg, and the above copper-clad laminate.

Compared with the prior art, the present application has the beneficial effects below.

In the resin composition of the present application, 30-60% of the silica obtained by chemical method, which has good particle size uniformity, is added to prepare the adhesive film having better elongation (up to 9-13%) and peel strength (up to 7.5-9.0 N/cm) than those prepared by common silica. At the same time, CTE and $D_f$ are also lower. The silica has a small average particle size and good uniformity, which can avoid the influence of large particles on the reliability of fine circuits, and is more suitable for preparing multilayer build-up printed boards with fine circuit.

DETAILED DESCRIPTION

Technical solutions of the present application are further described hereinafter via the embodiments. Those skilled in the art should understand that the examples are only to help understand the present application and should not be regarded as a specific limitation of the present application.

Raw materials used in the following examples and comparative examples are as follows:
  epoxy resin: NC-3000H (Nippon Kayaku);
  phenolic resin: SN-485 (Nippon Steel);
  active ester: HP-8000-65T (Japan DIC);
  cyanate: XU-371 (HUNTSMAN);
  hydrocarbon: B3000 (Nippon Soda);
  polyphenylene ether: MX9000 (SABIC, Saudi Arabia);
  maleimide resin: BMI3000;
  assistant crosslinking agent divinylbenzene: DVB (Nippon Steel);

silica 1 from Jiangsu Finetal, with D50 of 3.0 μm, D100:D10 of 2.3 and purity of 98%, is prepared by organosilicon hydrolysis;

silica 2 from Jiangsu Finetal, with D50 of 0.1 μm, D100:D10 of 2.3 and purity of 99.90%, is prepared by organosilicon hydrolysis;

silica 3 from Jiangsu Finetal, with D50 of 0.5 μm, D100:D10 of 2.0 and purity of 99.90%, is prepared by organosilicon hydrolysis;

silica 4 from Jiangsu Finetal, with D50 of 3.5 μm, D100:D10 of 3.0 and purity of 99.90%, is prepared by organosilicon hydrolysis;

silica 5 from Jiangsu Finetal, with D50 of 0.05 μm, D100:D10 of 2.3 and purity of 99.00%, is prepared by organosilicon hydrolysis.

Example 1

The 40 parts of an epoxy resin (NC-3000H) and 30 parts of a phenolic resin (SN-485) were first dissolved into an appropriate amount of a solvent, and stirred for more than or equal to 2 h.

Then 30 parts of silica 3 obtained by organosilicon hydrolysis (D50 was 0.5 μm, D100:D10 was 2.0 and the purity was 99.90%) was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Example 2

The same method as in Example 1 is used for preparing an adhesive film in this example except for changing the proportion of the silica synthesized by chemical method used in Example 1.

The 23 parts of an epoxy resin (NC-3000H) and 17 parts of a phenolic resin (SN-485) were first dissolved into an appropriate amount of a solvent, and stirred for more than or equal to 2 h.

Then 60 parts of silica 3 obtained by organosilicon hydrolysis (D50 was 0.5 μm, D100:D10 was 2.0 and the purity was 99.90%) was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Example 3

The 30 parts of an epoxy resin (NC-3000H) and 25 parts of a phenolic resin (SN-485) were first dissolved into an appropriate amount of a solvent, and stirred for more than or equal to 2 h.

Then 45 parts of silica 2 obtained by organosilicon hydrolysis (D50 was 0.1 μm, D100:D10 was 2.3 and the purity was 99.90%) was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Example 4

The 30 parts of an epoxy resin (NC-3000H), 15 parts of cyanate (XU-371) and 10 parts of an active ester resin (HP-8000-65T) were first dissolved into an appropriate amount of a solvent, and stirred for more than or equal to 2 h.

Then 45 parts of silica 3 obtained by organosilicon hydrolysis (D50 was 0.5 μm, D100:D10 was 2.0 and the purity was 99.90%) was added, and continued to be stirred for more than or equal to 4 h to be mixed fully, so as to form a varnish with a solid content of 65%.

The above varnish was coated on a release film, aired and then baked in an oven at 120° C. for 5 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Example 5

The 35 parts of cyanate (XU-371) and 20 parts of a maleimide resin (BMI3000) were first dissolved into an appropriate amount of a solvent, and stirred for more than or equal to 2 h.

Then 45 parts of silica 3 synthesized by chemical method (D50 was 0.5 μm, D100:D10 was 2.0 and the purity was 99.90%) was added, and continued to be stirred for more than or equal to 4 h to be mixed fully, so as to form a varnish with a solid content of 65%.

The above varnish was coated on a release film, aired and then baked in an oven at 120° C. for 5 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Example 6

The 30 parts of polyphenylene ether (MX9000), 20 parts of a hydrocarbon resin (XU-371) and 5 parts of an assistant crosslinking agent (DVB) were first dissolved into an appropriate amount of a solvent, and stirred for more than or equal to 2 h.

Then 45% of silica 3 synthesized by chemical method (D50 was 0.5 μm, D100:D10 was 2.0 and the purity was 99.90%) was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Example 7

The 30 parts of an epoxy resin (NC-3000H) and 25 parts of a phenolic resin (SN-485) were first dissolved into an appropriate amount of a solvent, and stirred for more than or equal to 2 h.

Then 45 parts of silica 1 obtained by organosilicon hydrolysis (D50 was 3.0 μm, D100:D10 was 2.3 and the purity was 98.00%) was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Comparative Example 1

The silica synthesized by chemical method in Example 1 is changed to a common silica, and an adhesive film is prepared by the same method as in Example 1.

An epoxy resin and a phenolic resin were first dissolved into an appropriate amount of a solvent, and stirred for more than or equal to 2 h.

Then 30% of the silica was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Comparative Example 2

The silica synthesized by chemical method in Example 2 is changed to a common silica powder, and an adhesive film is prepared by the same method as in Example 1.

An epoxy resin and a phenolic resin were first dissolved into an appropriate amount of a solvent, and stirred for more than or equal to 2 h.

Then 60% of the silica was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Comparative Example 3

The proportion of the silica obtained by chemical method in Example 1 is adjusted.

An epoxy resin and a phenolic resin were first dissolved into an appropriate amount of a solvent, and stirred for more than or equal to 2 h.

Then 20% of the silica synthesized by chemical method was added, and continued to be stirred for more than or equal to 4 h to be mixed fully, so as to form a varnish with a solid content of 65%.

The above varnish was coated on a release film, aired and then baked in an oven at 120° C. for 3-5 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Comparative Example 4

The proportion of the silica obtained by chemical method in Example 1 is adjusted.

An epoxy resin and a phenolic resin were first dissolved into an appropriate amount of a solvent, and stirred for more than or equal to 2 h.

Then 70% of the silica synthesized by chemical method was added, and continued to be stirred for more than or equal to 4 h to be mixed fully, so as to form a varnish with a solid content of 65%.

The above varnish was coated on a release film, aired and then baked in an oven at 120° C. for 3-5 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Comparative Example 5

The 30 parts of an epoxy resin (NC-3000H) and 25 parts of a phenolic resin (SN-485) were first dissolved into an appropriate amount of a solvent, and stirred for more than or equal to 2 h.

Then 45 parts of silica 5 obtained by organosilicon hydrolysis (D50 was 0.05 μm, D100:D10 was 2.3 and purity was 99.00%) was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Comparative Example 6

The 30 parts of an epoxy resin (NC-3000H) and 25 parts of a phenolic resin (SN-485) were first dissolved into an appropriate amount of a solvent, and stirred for more than or equal to 2 h.

Then 45 parts of silica 4 obtained by organosilicon hydrolysis (D50 was 3.5 μm, D100:D10 was 3.0 and the purity was 99.90%) was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Comparative Example 7

The 30 parts of an epoxy resin (NC-3000H), 15 parts of cyanate (XU-371) and 10 parts of an active ester resin (HP-8000-65T) were first dissolved into an appropriate amount of a solvent, and stirred for more than or equal to 2 h.

Then 45 parts of silica 4 obtained by organosilicon hydrolysis (D50 was 3.5 μm, D100:D10 was 3.0 and the purity was 99.90%) was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

Comparative Example 8

The 30 parts of polyphenylene ether (MX9000), 20 parts of a hydrocarbon resin (XU-371) and 5 parts of an assistant crosslinking agent (DVB) were first dissolved into an appropriate amount of a solvent, and stirred for more than or equal to 2 h.

Then 45 parts of silica 5 obtained by organosilicon hydrolysis (D50 was 0.05 μm, D100:D10 was 2.3 and the purity was 99.00%) was added, and continued to be stirred for more than or equal to 4 h to be mixed fully, so as to form a varnish with a solid content of 65%.

The above varnish was coated on a release film, aired and then baked in an oven at 120° C. for 3 min to obtain an adhesive film with a semi-cured resin layer. The semi-cured adhesive film (with a thickness of 40 μm) and a PCB after brown oxidation were laminated and cured, removed from the release film, and then subjected to surface treatment, chemical copper plating and electroplating, so as to form a build-up printed circuit board with a circuit.

The performance of the build-up printed circuit boards in the above examples and comparative examples is tested, and the test items and methods are as follows:

(1) elongation (30° C.): the DMA method is adopted, the temperature is kept at 30° C. for 5 min, and the preloading force is 0.01 N, and 3 N/min is increased to 17.5 N/min;
(2) peel strength: the method of IPC-TM-650 2.4.9 is used for testing;
(3) drilling processability: after laser drilling, the hole is sliced and then observed for the verticality, where the verticality of 90-95 degrees is evaluated as excellent, 96-100 degrees is evaluated as good, 101-110 degrees is evaluated as fair, greater than 110 degrees is evaluated as poor;
(4) adhesive-filling effect: a circuit board is manufactured with laminating the adhesive film, and then cut into slices to observe adhesive-filling condition between the circuit lines; the condition that the resin layer between the circuit lines does not have bubbles is evaluated as "excellent"; the condition that the resin layer between the circuit lines has bubbles and the bubble diameter is less than 1 micron is evaluated as "good"; and the condition that the resin layer between the circuit lines has bubbles and the bubble diameter is more than 1 micron is evaluated as "poor"; and
(5) fine circuit capability: a minimum line width/line spacing that can be manufactured is measured.

The comparison of performance test is shown in Table 1 and Table 2 below.

TABLE 1

|  | Example 1 | Example 2 | Example 3 | Example 4 | Example 5 | Example 6 | Example 7 |
| --- | --- | --- | --- | --- | --- | --- | --- |
| Elongation | 13% | 11% | 12.5% | 11% | 10% | 11% | 9% |
| Peel strength | 9.0 N/cm | 8.5 N/cm | 9.0 N/cm | 8.5 N/cm | 8.2 N/cm | 8.5 N/cm | 7.5 N/cm |
| Drilling processability | excellent | ecellent | ecellent | excellent | excellent | excellent | good |
| Adhesive-filling effect | excellent | excellent | excellent | excellent | excellent | excellent | good |
| Fine circuit capability | 15/15 | 15/15 | 15/15 | 15/15 | 15/15 | 15/15 | 20/20 |

TABLE 2

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Elongation | 6% | 5% | 8% | 7% | 6.5% | 6% | 5.5% | 6% |
| Peel strength | 6.0 N/cm | 5.0 N/cm | 7.5 N/cm | 7.2 N/cm | 7.5 N/cm | 7.0 N/cm | 7.0 N/cm | 7.2 N/cm |
| Drilling processability | fair | poor | excellent | good | good | good | good | good |
| Adhesive-filling effect | fair | poor | excellent | good | good | good | good | good |
| Fine circuit capability | 30/30 | 30/30 | 20/20 | 30/30 | 20/20 | 30/30 | 30/30 | 30/30 |

It can be seen from Table 1 and Table 2 that Examples 1-7 has high elongation (9-13%) and peel strength (8.2-9.0 N/cm), good drilling processability, good adhesive-filling ability, and good reliability of fine circuits. In Examples 1-3, the elongation of epoxy and phenolic systems which employ chemical spherical silica in the particle size range of the present application is better than that of other resin systems. In Example 7, the filler has low purity, resulting in slightly lower elongation, peel strength and processability than those with high purity of filler. In Comparative Example 1 and Comparative Example 2, the adhesive film prepared with common silica has low elongation, low peel strength and poor drilling processability. In Comparative Example 3 and Comparative Example 4, the proportion of silica obtained by chemical method does not meet the limited range of the present application and also leads to the problems of low elongation and low peel strength. In Comparative Example 5, the average particle size of the used silica obtained by chemical method is too small, resulting in low elongation and low peel strength, and in Comparative Example 6, the D100:D10 is more than 2.5, and similarly, the elongation is low, the peel strength is low and the fine circuit capability is poor.

The applicant declares that the resin composition and the application thereof in the present application are illustrated by the above examples, but the present application is not limited to the above examples, that is, the present application does not necessarily rely on the above examples to be implemented. Those skilled in the art should understand that any improvement of the present application, the equivalent substitution of each raw material of products, the addition of auxiliary ingredients, and the selection of specific methods in the present application shall fall within the protection scope and disclosure scope of the present application.

What is claimed is:

1. A resin composition, which comprises the following components by weight percentage: 40-70% of a cross-linkable curing resin, and 30-60% of a filler, wherein the filler is silica prepared by organosilicon hydrolysis, the silica has an average particle size D50 of 0.1-3 μm, and the silica has a particle size ratio D100:D10 of less than or equal to 2.5 and greater than or equal to 1.3; wherein the silica has a purity of more than 99.9%.

2. The resin composition according to claim 1, wherein the silica has an average particle size D50 of 0.3-1.0 μm.

3. The resin composition according to claim 1, wherein the silica is obtained by subjecting organosilicon to a hydrolysis reaction to obtain a preliminary product and then heating the preliminary product, wherein
the heating is performed at 800-1300° C.;
the organosilicon is alkoxysilane; and
the alkoxysilane comprises tetraethoxysilane, tetramethoxysilane, tetraphenoxysilane, tetra-n-butoxysilane, tetraisobutoxysilane, methyltriethoxysilane, or dimethyldiethoxysilane.

4. The resin composition according to claim 1, wherein the crosslinkable curing resin is a thermosetting curing resin, a photocurable resin or a thermosetting/photocurable dual curing resin.

5. An adhesive film, which is prepared by coating the resin composition according to claim 1 on a release material and then drying and/or baking the same, wherein the adhesive film has a thickness of 5-300 μm.

6. A resin-coated copper foil, which comprises a copper foil and a resin composition adhered to the copper foil after coating and drying,
wherein the resin composition comprises the following components by weight percentage: 40-70% of a cross-linkable curing resin, and 30-60% of a filler, wherein the filler is silica prepared by organosilicon hydrolysis, the silica has an average particle size D50 of 0.1-3 μm, and the silica has a particle size ratio D100:D10 of less than or equal to 2.5,
wherein a resin layer of the resin-coated copper foil has a thickness of 5-300 μm and the copper foil of the resin-coated copper foil has a thickness of 1-105 μm.

7. A semi-cured prepreg, which is formed by impregnating fiberglass cloth with resin composition according and drying the same, wherein the resin composition comprises the following components by weight percentage: 40-70% of a cross-linkable curing resin, and 30-60% of a filler, wherein the filler is silica prepared by organosilicon hydrolysis, the silica has an average particle size D50 of 0.1-3 μm, and the silica has a particle size ratio D100:D10 of less than or equal to 2.5.

8. The resin composition according to claim 1, wherein the crosslinkable curing resin comprises any one or a combination of at least two of an epoxy resin, a phenolic resin, a phenoxy resin, a cyanate resin, active ester, a polyphenylene ether resin, a maleimide resin, a hydrocarbon resin, an acrylate resin, a polyimide resin, an organosilicon resin, a polybenzoxazole resin, a polyester resin or polystyrene.

9. The resin composition according to claim 8, wherein the epoxy resin comprises any one or a combination of at least two of a bisphenol A epoxy resin, a bisphenol F epoxy resin, a phosphorus-containing epoxy resin, an MDI-modified epoxy resin, a phenolic epoxy resin, a biphenyl epoxy resin, a dicyclopentadiene epoxy resin, a naphthalene-containing epoxy resin or an alicyclic epoxy resin.

10. The resin composition according to claim 8, wherein the phenolic resin comprises any one or a combination of at least two of a bisphenol A phenolic resin, a phenol phenolic resin, a biphenyl phenolic resin, a dicyclopentadiene phenolic resin or a naphthalene-containing phenolic resin.

11. The adhesive film according to claim 5, wherein the adhesive film has a thickness of 10-200 μm.

12. The adhesive film according to claim 5, wherein the adhesive film has a thickness of 20-100 μm.

13. The resin-coated copper foil according to claim 6, wherein the resin layer of the resin-coated copper foil has a thickness of 10-200 μm and the copper foil of the resin-coated copper foil has a thickness of 3-35 μm.

14. The resin-coated copper foil according to claim 6, wherein the resin layer of the resin-coated copper foil has a thickness of 20-100 μm and the copper foil of the resin-coated copper foil has a thickness of 5-18 μm.

15. A copper-clad laminate, which is prepared by using one or at least two of an adhesive film which is prepared by coating the resin composition according to claim 1 on a release material and then drying and/or baking the same, a resin-coated copper foil which comprises a copper foil and the resin composition according to claim 1 adhered to the copper foil after coating and drying, and a semi-cured prepreg which is prepared by impregnating fiberglass cloth with the resin composition according to claim 1 and drying the same.

16. A multilayer board, which is prepared by using one or at least two of an adhesive film which is prepared by coating the resin composition according to claim 1 on a release material and then drying and/or baking the same, a resin-coated copper foil which comprises a copper foil and the resin composition according to claim 1 adhered to the copper foil after coating and drying, a semi-cured prepreg which is prepared by impregnating fiberglass cloth with the resin composition according to claim 1 and drying the same, and a copper-clad laminate which is prepared by using one or at least two of an adhesive film which is prepared by coating the resin composition according to claim 1 on a release material and then drying and/or baking the same, a resin-coated copper foil which comprises a copper foil and the resin composition according to claim 1 adhered to the copper foil after coating and drying, and a semi-cured prepreg which is prepared by impregnating fiberglass cloth with the resin composition according to claim 1 and drying the same.

* * * * *